Dec. 26, 1967  J. P. PEACH  3,360,245
APPARATUS FOR TREATING SEED GRAIN IN A SEED DRILL
Filed Feb. 28, 1966  2 Sheets-Sheet 2
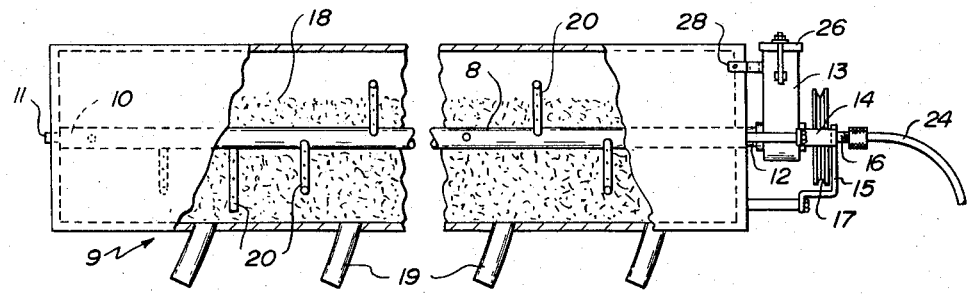
Fig. 7.
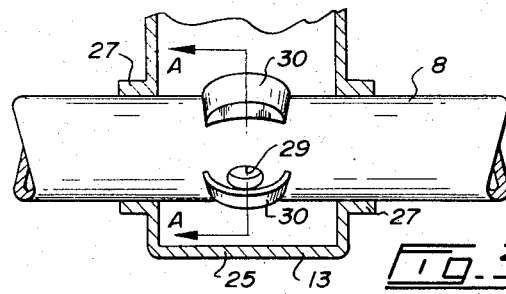
Fig. 3.
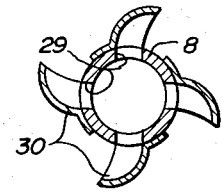
Fig. 4.
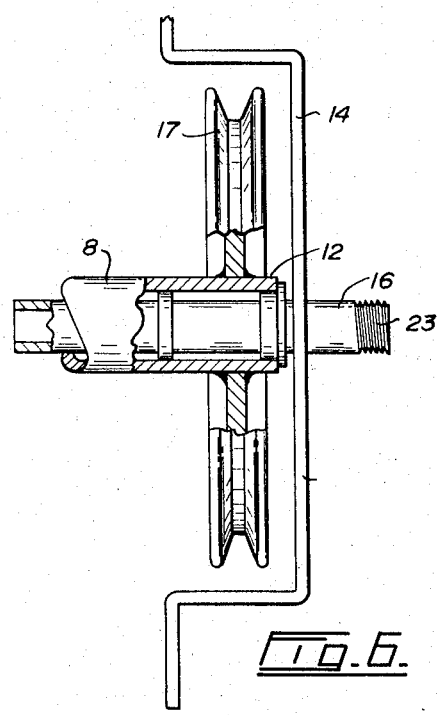
Fig. 6.
Fig. 5.
JAMES P. PEACH
INVENTOR
BY
ATTORNEY 3,360,245
APPARATUS FOR TREATING SEED GRAIN IN A SEED DRILL
James P. Peach, Peers, Alberta, Canada
Filed Feb. 28, 1966, Ser. No. 530,705
3 Claims. (Cl. 259—25)

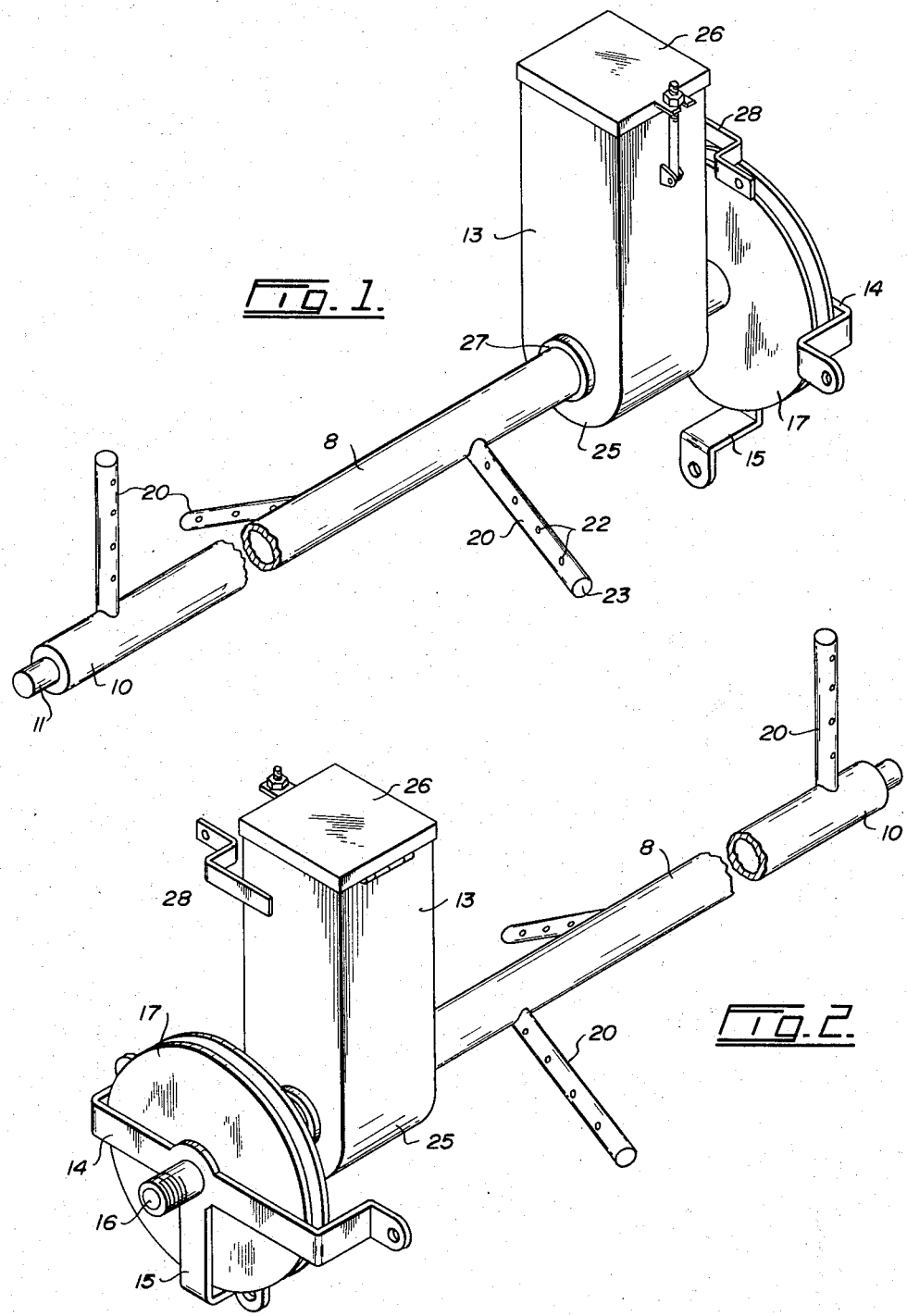

ABSTRACT OF THE DISCLOSURE

An apparatus for feeding chemicals into a seed drill box which includes a pipe rotatably mounted within the box. A source of air pressure is connected into one end of the pipe. A chemical container is mounted on the pipe and feeds into the pipe through openings therein. Discharge openings are provided in the pipe. Chemical is fed under pressure through the pipe into the seed.

---

This invention relates generally to the treatment of seed grain and the like and particularly to apparatus for treating seed grain in the box of a seed drill or other agricultural implement.

In many cases, it is necessary to treat seed grain prior to depositing the grain into the ground. Such treatment acts to destroy disease of the seed and to aid in its germination. Usually the seed is treated by the laborious method of hand mixing chemicals with the seed prior to depositing the seed in the box of a seed drill or chemical is added to the seed in the box of the seed drill.

The chief difficulty in seed treatment in this manner lies in the effort involved in handling the seed grain while it is being treated and by the fact that such methods are usually inefficient and result in an uneven distribution of chemicals through the seed and the over and under treatment of various portions of the seed.

My invention is designed to overcome the above and other difficulties now present in the treatment of seed and provides a mechanism within the seed box of the drill that will forcibly discharge the chemical into the grain in the box and at the same time will agitate the grain in the box so that an even distribution of the chemicals throughout the seed will result.

In drawings illustrating a preferred embodiment:

FIG. 1 is a broken away perspective view of the seed treating apparatus of my invention.

FIG. 2 is a broken away isometric view of the apparatus of FIG. 1 viewed from the opposite end.

FIG. 3 is an enlarged broken away sectional side elevation showing a portion of the seed treatment box with the chemical pick up mechanism.

FIG. 4 is an enlarged sectional end elevation of the seed treatment pipe and the chemical pick up scoops as taken at the line A—A of FIG. 3.

FIG. 5 is an enlarged broken away sectional side elevation showing a portion of the seed treatment pipe with one of the treatment fingers.

FIG. 6 is a partly sectional plan view showing the pipe actuating pulley and the air discharge.

FIG. 7 is a broken away sectional side elevation showing a seed treatment box with my apparatus installed therein.

As seen in FIG. 7 in the drawings my device includes the elongated pipe 8 which is mounted substantially centrally and longitudinally in the grain box designated generally at 9. One end 10 of the pipe 8 is supported in the box 9 for rotation. The opposite end 12 of the pipe extends through the box 9 and the chemical container 13 and is rotatably supported by the brackets 14 which are interconnected to the end of the box 9. An air intake pipe 16 connects into the end 12 of the pipe 8. Rotation of the pipe 8 is accomplished through the V pulley 17 which is mounted on the pipe 8 and which would normally be coupled to the power source.

The box 9 normally would contain seed grain or the like indicated at 18 which grain would customarily be discharged through the outlets 19 or other suitable means. The pipe 8 is provided with a plurality of fingers 20 which project radially from the pipe 8 and are connected at one end with the pipe 8 through the openings 21. The fingers 20 are each provided with a plurality of openings 22 and are closed at their outer ends so that discharge from the fingers 20 will be through the openings 22. The air intake 16 connected into the end 12 of the pipe 8 is preferably threaded, as indicated at 23, for connection to an air supply pipe 24 which would supply air under suitable pressure.

The chemical container 13 is, in the preferred embodiment illustrated, rectangular in form with a rounded bottom 25 and a hinged lid 26. The container 13 is mounted on the pipe 8 on side bearings 27 which allow rotation of the pipe 8 in the container 13 and which will provide an adequate seal between the pipe 8 and the container 13 as the pipe 8 rotates. The container 13 is held stationary by side bracket 28 which would be connected to a suitable stationary portion of the complete structure.

The chemical in the container 13 is admitted to the pipe 8 through a plurality of openings 29 formed in the pipe 8 with a plurality of scoops 30 which serve to direct chemical from the container 13 through the openings 29 into the pipe 8.

In operation, the pipe 8 would be installed in the grain box or other seed container and supported rotatably at its ends through the bearing 11 and through the air intake 16 and brackets 14 as described. The container 13 would be filled with the chemical desired, the air supply pipe 24 connected to a suitable air supply and the pulley 17 connected through suitable belting to a source of power.

Rotation of the pipe 8 would then pick up chemical from the container 13 and this chemical would be fed through the openings 29 into the pipe 8. The air under pressure from the supply line 24 would then drive this chemical through the rotating pipe 8 and out through the fingers 20 to be discharged into the grain 18 in the box. During rotation of the pipe 8, the fingers 20 obviously would agitate the grain sufficiently that the chemical discharged through the openings 21 would be thoroughly mixed with the grain.

While various rotational speeds of the pipe 8 and air pressures could be employed, I have found that in a conventional seed drill operating at usual forward speed, a rotational speed of the pipe at 50 r.p.m. is satisfactory and air pressure of 100 to 120 lbs. is sufficient to drive the chemical out through the openings 21 in the fingers 20 and ensure adequate distribution of the chemical through the grain 18 or other seed in the box 9.

What I claim as my invention is:

1. Apparatus adapted to treat seed grain in the box of a seed drill comprising, in combination:
    A pipe adapted to be rotated within the box;
    Means connected into the pipe at one end thereof for supplying air under pressure thereto;
    Means, adapted to contain chemical, connected into the pipe for admitting chemical thereto;
    Said pipe defining openings therein for the discharge of chemical under pressure.

2. The apparatus as defined in claim 1 wherein:
    Hollow fingers, closed at their outer end and defining openings along their lengths, are connected into the openings in the pipe.

3. Apparatus adapted to treat seed grain in the box of a seed drill comprising, in combination:
A pipe, adapted to be longitudinally, rotatably mounted within the box, said pipe defining a plurality of openings;
Means connected into the pipe at one end thereof for supplying air under pressure thereto; and
A container mounted on the pipe adapted to feed chemical to openings in the pipe at a predetermined rate dependent on the speed of rotation of the pipe.

References Cited

UNITED STATES PATENTS

| | | | |
|---|---|---|---|
| 312,671 | 2/1885 | Tambling | 259—25 |
| 2,689,374 | 9/1954 | Toulmin | 259—25 X |
| 3,131,911 | 9/1964 | Geerlings | 259—9 X |

WALTER A. SCHEEL, *Primary Examiner.*

J. M. BELL, *Assistant Examiner.*